July 9, 1929.                W. WEILER                1,719,917
                    INDUCTION MOTOR CONTROL SYSTEM
                         Filed May 2, 1927
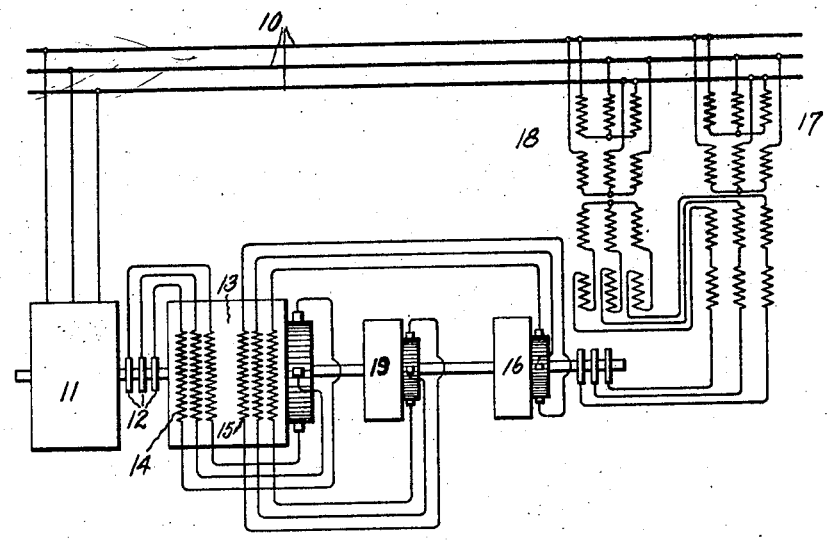
Inventor:
Wilhelm Weiler,
by *Alexander F. [signature]*
His Attorney.

Patented July 9, 1929.

1,719,917

UNITED STATES PATENT OFFICE.

WILHELM WEILER, OF NIEDERSCHONHAUSEN, BERLIN, GERMANY, ASSIGNOR TO GENERAL ELECTRIC COMPANY, A CORPORATION OF NEW YORK.

INDUCTION-MOTOR-CONTROL SYSTEM.

Application filed May 2, 1927, Serial No. 188,102, and in Germany November 11, 1926.

My invention relates to control systems for induction motors in which commutator type regulating apparatus excited from the line is employed in connection with the secondary circuit of the induction machine. In particular, my invention relates to an arrangement for balancing the variation in the inductive drop in the exciting circuit occasioned by variations in the secondary frequency to the end that the size of the regulating apparatus may be reduced.

It is customary to excite the commutator regulating machine of such systems through a frequency changer and a pair of regulating transformers, one transformer arranged to regulate the speed of the induction motor and the other the power factor. The size of the two transformers and frequency converter as heretofore used were such as to supply all of the excitation voltage which becomes considerable at speeds of the induction machine remote from synchronism because of the inductive drop at the higher frequencies.

According to my invention I provide an additional exciter for supplying the greater part of the inductive drop voltage so that the regulating transformers and frequency converter need to supply only that voltage required for regulation instead of that required for both regulation and inductive drop.

The features of my invention which are believed to be novel and patentable will be pointed out in the claim appended hereto. For a better understanding of my invention, reference is made in the following description to the accompanying drawing which shows a preferred arrangement of my invention in an induction motor regulating system as above outlined.

In the drawing, 10 represents the supply line, 11 the main induction machine, 12 its secondary slip rings, and 13 the commutator type regulating machine connected in cascade with the secondary of the induction machine through a compensating winding 14. The main exciting winding of the machine 13 is represented at 15. One end of this exciting winding 15 is supplied through a frequency converter 16 and regulating transformers 17 and 18 from the source 10. In order that the excitation frequency may be correct the regulating machine 13 and the frequency converter 16 are driven with the main motor. The regulating transformers 17 and 18 are of a well-known double winding type having relatively rotatable primary and secondary members with the secondary windings connected in series. Regulation of transformer 18 varies the power factor of machine 11 and regulation of transformer 17 varies the speed of machine 11. If the lower end of the main exciting windings 15 were connected in star, we would thus have the well-known arrangement in which all of the excitation voltage for machine 13 would have to be supplied through transformers 17 and 18 and the frequency converter 16.

The required exciting voltage is small at speeds of the induction machine which are close to synchronous speed but increases as the secondary frequency and voltage increases so that heretofore the apparatus through which this excitation was supplied had to be designed to meet the excitation requirements at maximum slip.

According to my invention the winding 15 is connected in series with an additional exciting machine or phase advancer 19 driven with the main motor 11. This additional machine has no stator winding and produces a voltage proportional to the armature current. It is arranged to supply a leading voltage to the exciting circuit which is preferably slightly less than the maximum inductive drop voltage at maximum slip. This machine is thus caused to supply practically all of the variable inductive drop voltage excitation and consequently the apparatus consisting of transformers 17 and 18 and the frequency converter 16 may be materially reduced in size and rating.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

A speed control system for induction machines comprising in combination with such a machine a source of supply therefor, a commutator type regulating machine concatenated with said induction machine, an exciting winding on said regulating machine, a pair of adjustable transformers having their primaries connected in said supply line and their secondaries connected in series, a frequency converter connected between said secondaries and said exciting winding, and a phase advancer connected in series with said exciting winding, said transformers supplying excitation to said regulating machine for varying the speed and power factor of said induction machine and said phase advancer supplying inductive drop excitation to said regulating machine exciting winding.

In witness whereof, I have hereunto set my hand this 13th day of April, 1927.

WILH. WEILER.